Patented Nov. 26, 1940

2,222,928

UNITED STATES PATENT OFFICE 2,222,928

POLYVINYL HALIDE COMPOSITIONS

Claude H. Alexander, Cuyahoga Falls, Ohio, assignor to The B. F. Goodrich Company, New York, N. Y., a corporation of New York No Drawing. Application May 17, 1939, Serial No. 274,227

6 Claims. (Cl. 260—36)

This invention relates to polyvinyl halides, and has as its object to provide polyvinyl halide compositions with improved dielectric properties.

Polyvinyl halides in general and plasticized gamma polyvinyl chlorides in particular are very desirable materials for electrical insulation because they are extraordinarily resistant to water, oils, and other solvents, they can be easily applied to conductors by a number of methods, and the mechanical properties of the compositions can be varied over a wide range by changing the proportion of the plasticizer. The preparation of these compositions is disclosed in detail in U. S. Patent No. 1,929,453 issued to Waldo L. Semon.

I have discovered that the dielectric properties of polyvinyl halides are greatly improved by the concurrent presence in the compositions of sulfur-free compounds containing cationic lead, and sulfur or sulfur compounds containing bivalent or tetravalent sulfur. The term "cationic lead" is used to mean lead which has combined with other elements as a cation.

A great variety of sulfur-free compounds containing cationic lead, including the various lead oxides, lead nitrate, lead chloride, lead acetate, tetraphenyl lead, tetraethyl lead, triethyl lead chloride, lead oleate, lead stearate, lead oxalate, lead silicate, etc., may be employed. The lead compounds may advantageously be used in proportions as low as .5% or less and as high as 10% or over based on the weight of the plasticized composition. Compounds containing lead combined only as an anion such as sodium plumbate are without the scope of this invention.

There are a very great number of compounds through which the bi- or tetravalent sulfur may be supplied to the composition. The compound may be one such as lead sulfide in which the lead and sulfur are combined. A combination of free sulfur and any sulfur compound may be used. Suitable bivalent sulfur compounds include not only metallic sulfides, but also organic sulfur compounds such as thioalcohols, thioethers, thioesters, thioaldehydes, thioacids, thiocarbamates, mercaptothiazoles, and thiuram sulfides, particularly compounds which are di- or polysulfides. Although the bivalent sulfur compounds are preferred to those having four valences, tetravalent compounds such as the metallic sulfites, particularly lead sulfite, may be used.

A most useful embodiment of my invention is the combination of lead oxide or a lead salt such as lead silicate with a plasticizer containing bi- or tetravalent sulfur, which combination obviates the necessity of using any other plasticizer and produces compositions having superior dielectric properties. The plasticizer may also contain free sulfur, especially the monoclinic form which is usually conceded to be bivalent. Suitable sulfur-containing plasticizers include the thianthrenes such as 2,6 dimethyl thianthrene and organic sulfides such as diamyl thiodiglycollate and the dibenzyl ether of thiodiglycol. One of the valuable classes of such plasticizers comprises the thioethers having the structural formula R—S—R' wherein R is a hydrocarbon group such as methyl, ethyl, isopropyl, amyl vinyl, cyclohexyl, benzyl, phenyl, etc., and R' is an aryl group such as phenyl, tolyl, xylyl, naphthyl, xenyl, etc. Examples of this class of plasticizers include amyl beta-naphthyl sulfide, cyclohexyl beta-naphthyl sulfide, ditolyl sulfide, ethyl alpha-naphthyl sulfide, isopropyl paratolyl sulfide, phenyl orthotolyl sulfide, etc.

Materials such as carbon black, zinc oxide, clay, barytes, wood flour, and other pigments and fillers commonly used in the rubber and plastics industries may also be included in the polyvinyl halide compositions.

As a specific embodiment of my invention, I will show how the dielectric properties of polyvinyl chloride compositions may be improved by using lead compounds in conjunction with 2,6 dimethyl thianthrene. I prepared a composition containing gamma polyvinyl chloride 56 parts by weight, 2,6 dimethyl thianthrene 42 parts, and precipitated lead silicate 2 parts, and homogenized the mixture on a heated mill. The values for the power factors of this composition at various temperatures are as follows:

| Temperature........deg. C.. | 30 | 40 | 50 | 70 | 90 | 100 |
|---|---|---|---|---|---|---|
| Power factor at 1,000 cycles percent.. | 11.6 | 12.6 | 10.8 | 3.6 | 2.0 | 1.6 |

It can be readily seen that the power factor is very small at high temperatures. It is especially noteworthy that at 100° C., the power factor is still decreasing, a condition which I have never obtained without using the method of this invention.

As another specific example, a composition was prepared containing gamma polyvinyl chloride 50.9 parts by weight, 2,6 dimethyl thianthrene 39.1 parts, litharge 5.0 parts, and carbon black 5.0 parts. The excellent dielectric properties of the composition are shown by the following:

| Temperature_____deg. C.. | 30 | 40 | 50 | 70 | 90 | 100 |
|---|---|---|---|---|---|---|
| Power factor at 1,000 cycles percent.. | 10.6 | 12.6 | 12.3 | 4.8 | 2.2 | 1.8 |

The extremely low power factor at high temperatures allows the compositions of my invention to be used as insulation in many places where former polyvinyl halide compositions could not profitably be employed.

It is my intention to claim only compositions of which the basis is substantially a polyvinyl halide plastic, which compositions may contain suitable proportions of such adjuvants as plasticizers, stabilizers, pigments, fillers, and the like, as has already been pointed out above, but not compositions which are basically of a different character, and consist largely of other plastics. The polyvinyl halide may be a halide other than the chloride, such as the bromide, and may even be a copolymer of a vinyl halide with minor proportions of other polymerizable compounds such as vinyl acetate, but the best results are at present secured with the pure gamma polymer of vinyl chloride, and preferably in the absence of other plastics.

This application is in part a continuation of my co-pending application Serial No. 162,333 filed September 3, 1937.

Although I have herein disclosed specific embodiments of my invention, I do not limit myself wholly thereto, for many modifications such as the substitution of equivalent materials and the variation of proportions used are within the spirit and scope of the invention as defined in the appended claims.

I claim:

1. A composition of matter of which the basis is substantially a polyvinyl halide plastic, said composition comprising a sulfur-free compound containing cationic lead, and a member of the class consisting of sulfur, compounds containing bivalent sulfur, and compounds containing tetravalent sulfur.

2. A composition of matter of which the basis is substantially a polyvinyl chloride plastic, said composition comprising a sulfur-free compound containing cationic lead, and a member of the class consisting of sulfur, compounds containing bivalent sulfur, and compounds containing tetravalent sulfur.

3. A composition of matter containing polyvinyl chloride as the sole plastic ingredient, said composition comprising a sulfur-free compound containing cationic lead, and a member of the class consisting of sulfur, compounds containing bivalent sulfur, and compounds containing tetravalent sulfur.

4. A composition of matter of which the basis is substantially a polyvinyl chloride plastic, said composition comprising a sulfur-free compound containing cationic lead and a plasticizer containing bivalent sulfur.

5. A composition of matter of which the basis is substantially a polyvinyl chloride plastic, said composition comprising a sulfur-free compound containing cationic lead and a thioether plasticizer having the structural formula R—S—R' wherein R is a hydrocarbon group and R' is an aryl group.

6. A composition of matter of which the basis is substantially a polyvinyl chloride plastic, said composition comprising a sulfur-free compound containing cationic lead and amyl beta-naphthyl sulfide.

CLAUDE H. ALEXANDER.